United States Patent
Weiss et al.

(10) Patent No.: US 7,509,328 B2
(45) Date of Patent: *Mar. 24, 2009

(54) CUSTOMIZING SOFTWARE APPLICATIONS THAT USE AN ELECTRONIC DATABASE WITH STORED PRODUCT DATA

(75) Inventors: Jochen Weiss, Helmsheim (DE); Peter Conrad, Leimen (DE); Uwe Zachmann, Rauenberg (DE)

(73) Assignee: SAP Aktiengesellschaft, Walldorf (DE)

( * ) Notice: Subject to any disclaimer, the term of this patent is extended or adjusted under 35 U.S.C. 154(b) by 303 days.

This patent is subject to a terminal disclaimer.

(21) Appl. No.: 10/876,862

(22) Filed: Jun. 25, 2004

(65) Prior Publication Data

US 2005/0289154 A1 Dec. 29, 2005

(51) Int. Cl.
*G06F 7/00* (2006.01)

(52) U.S. Cl. .......................... 707/100; 707/102; 707/7

(58) Field of Classification Search .................. 707/100
See application file for complete search history.

(56) References Cited

U.S. PATENT DOCUMENTS

| | | | | |
|---|---|---|---|---|
| 6,035,284 A | * | 3/2000 | Straub et al. | 705/28 |
| 6,301,584 B1 | * | 10/2001 | Ranger | 707/103 R |
| 6,671,368 B1 | * | 12/2003 | Contino et al. | 379/265.09 |
| 6,782,370 B1 | * | 8/2004 | Stack | 705/10 |
| 7,076,453 B2 | * | 7/2006 | Jammes et al. | 705/26 |
| 7,143,076 B2 | * | 11/2006 | Weinberg et al. | 707/1 |
| 7,213,227 B2 | * | 5/2007 | Kompalli et al. | 717/108 |
| 7,233,958 B2 | * | 6/2007 | Weng et al. | 707/104.1 |
| 2004/0093281 A1 | * | 5/2004 | Silverstein et al. | 705/26 |
| 2005/0010504 A1 | * | 1/2005 | Gebhard et al. | 705/34 |
| 2005/0096849 A1 | * | 5/2005 | Sorrells | 702/19 |
| 2005/0289158 A1 | * | 12/2005 | Weiss et al. | 707/100 |
| 2006/0190355 A1 | * | 8/2006 | Jammes et al. | 705/27 |
| 2006/0212921 A1 | * | 9/2006 | Carr | 725/136 |

* cited by examiner

*Primary Examiner*—Don Wong
*Assistant Examiner*—Binh V Ho
(74) *Attorney, Agent, or Firm*—Fish & Richardson P.C.

(57) ABSTRACT

A method and computer program product are provided for customizing an application software program that during execution communicates with an electronic database of product data. The method includes receiving an input indicating a user selection of a predefined database attribute that is defined to be an identifier type of attribute. The selected attribute is associated with a category of products for which data relating to products that are members of the product category are stored in the electronic database. The method also includes defining the selected attribute to be used during execution of a selected procedure of the application software program, wherein the selected procedure includes a product-identifying function.

20 Claims, 11 Drawing Sheets

PRODUCT DATA STRUCTURE

| Product - 1 | ID Status |
|---|---|
| • Std. Unique ID Value | Yes |
| • Product Category | No |
| • Attribute - 1 Value | No |
| • Attribute - 2 Value | Yes |
| • Attribute - 3 Value | No |
| ⋮ | ⋮ |
| • Attribute - N Value | No |

INDIVIDUAL PRODUCT DATA STRUCTURE

| Individual - Product - 1 | ID Status |
|---|---|
| • I - Prod. Unique ID Value | Yes |
| • Product ID | No |
| • Attribute - 1 Value | Yes |
| • Attribute - 2 Value | No |
| • Attribute - 3 Value | Yes |
| ⋮ | ⋮ |
| • Attribute - N Value | No |

FIG. 3

PRODUCT DATA

| Tolstoy's War and Peace | ID Status |
|---|---|
| • GUID = 37NV356 | Yes |
| • Product Category = Books | No |
| • ISBN = 0451523261 | Yes |
| • Publisher = Book Co. | No |
| • ⋮ | • ⋮ |
| • Retail Price = $12.99 USD | No |

INDIVIDUAL PRODUCT DATA

| A Unique Automobile | ID Status |
|---|---|
| • VIN = 374VXC5827X5 | Yes |
| • Product ID = GUID for 1998 Volvo S70 | No |
| • License = Minnesota 327 - GVX | Yes |
| • Color = Red | No |
| • Owners Address = 320 Main St., Minneapolis, MN | Yes |
| • ⋮ | • ⋮ |
| • Engine = 5 cylinder | No |

FIG. 4

CUSTOMIZING SOFTWARE APPLICATIONS THAT USE AN ELECTRONIC DATABASE WITH STORED PRODUCT DATA

TECHNICAL FIELD

This invention relates to identifier attributes for product data stored in an electronic database, and also to business application software programs that during operation utilize the product data database.

BACKGROUND

Electronic databases of product data are widespread and have many uses. One example of a software tool for creating and maintaining product data is a product master data software application distributed by SAP A.G. of Walldorf, Germany. Product data stored in an electronic database may be referred to generally as "product master data," in that the product data is typically centrally stored and maintained, and thus accessible for various different software applications that during their operation interact with the product data database, either to access previously stored product data or to create and revise product data.

In a common database software design configuration, products may be logically organized to fall within a particular product category. In such a case, a product category may have a data structure definition that is created for the category and that defines the various product attributes that are possible for product records within the category that are created and stored in the product data database. Thus, upon creation of new product database record, or instance, that is a member of the defined product category, the product record inherits the attributes defined for the product category.

A product attribute defined for a product category may be defined in the product category data structure to be an identifier type of attribute. This enables the attribute to be used as an identifier of a product record by various software applications that use the product data. For example, a value for an identifier type of attribute may be displayed as header information on a user interface when a product record is retrieved from the database. Also, the identifying attribute may be used as a search field for product records stored in the database. In some known systems, there is provided no possibility to search for normal attributes (that is, attributes that have not been defined to be identifier-type attributes) without modifying the product data model through a hard software coding procedure.

Moreover, a product category data structure definition may be hard-coded, and an experienced software programmer may be needed to create and revise the data structure. As such, the attribute or attributes defined to be identifier-type attribute or attributes may be established in the product category data structure such that those definitions cannot be easily changed. This is disadvantageous in scenarios where many different software procedures, perhaps from many different application software programs, all make use of the same product data database. Different identifying characteristics, or attributes, may be useful for different software application program procedures. This is also disadvantageous because it limits the usefulness and flexibility of using the product data database in a wide range of applications.

SUMMARY

Generally, the invention provides a framework within which identifier attributes for product data stored in an electronic database may be easily defined and customized for use with various different software application procedures that communicate with the product data database.

In one aspect, a method is provided for customizing an application software program that during execution communicates with an electronic database of product data.

The method includes receiving an input indicating a user selection of a predefined database attribute that is defined to be an identifier type of attribute. The selected attribute is associated with a category of products for which data relating to products that are members of the product category are stored in the electronic database. The method also includes defining the selected attribute to be used during execution of a selected procedure of the application software program, wherein the selected procedure includes a product-identifying function.

In various implementations, the method may include one or more of the following. The data structure may have more than one attributes predefined to be an identifier type of attribute. The method may be performed multiple times to select multiple attributes to be used during execution of the selected procedure. The selected attribute may be further defined as a main identifier type that is used in a product record header display procedure. The application software program procedure may be a product search procedure, in which case the selected attribute is usable as a search field to perform a product search. The application software program procedure may alternatively involve the display of product identifying information for a product record stored in the electronic database. The method may also include providing a visual display of a list of attributes from which the selection of a predefined database attribute is made.

Multiple different software application programs may provide for communication with the same electronic database of product data. In such a case, the method may involve different identifier type attributes being defined to be used for different application software program procedures. In addition, multiple different business processes within the same software application program may each provide for communication with the same electronic database of product data. In such a case, different identifier type attributes may be defined to be used for different procedures.

In another aspect, a computer program product is provided that is tangibly embodied on an information carrier, such as computer program memory or a propagated signal for example. The computer program product comprises program instructions that when executed perform the above-described methods for customizing an application software program that during execution communicates with an electronic database of product data.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 are example data structures for product master data, such as the product master data stored within the system shown in FIG. 1.

FIG. 4 are example product master data that use the example data structures shown in FIG. 3.

Like reference symbols in the various drawings indicate like elements.

DETAILED DESCRIPTION

Figure 1:
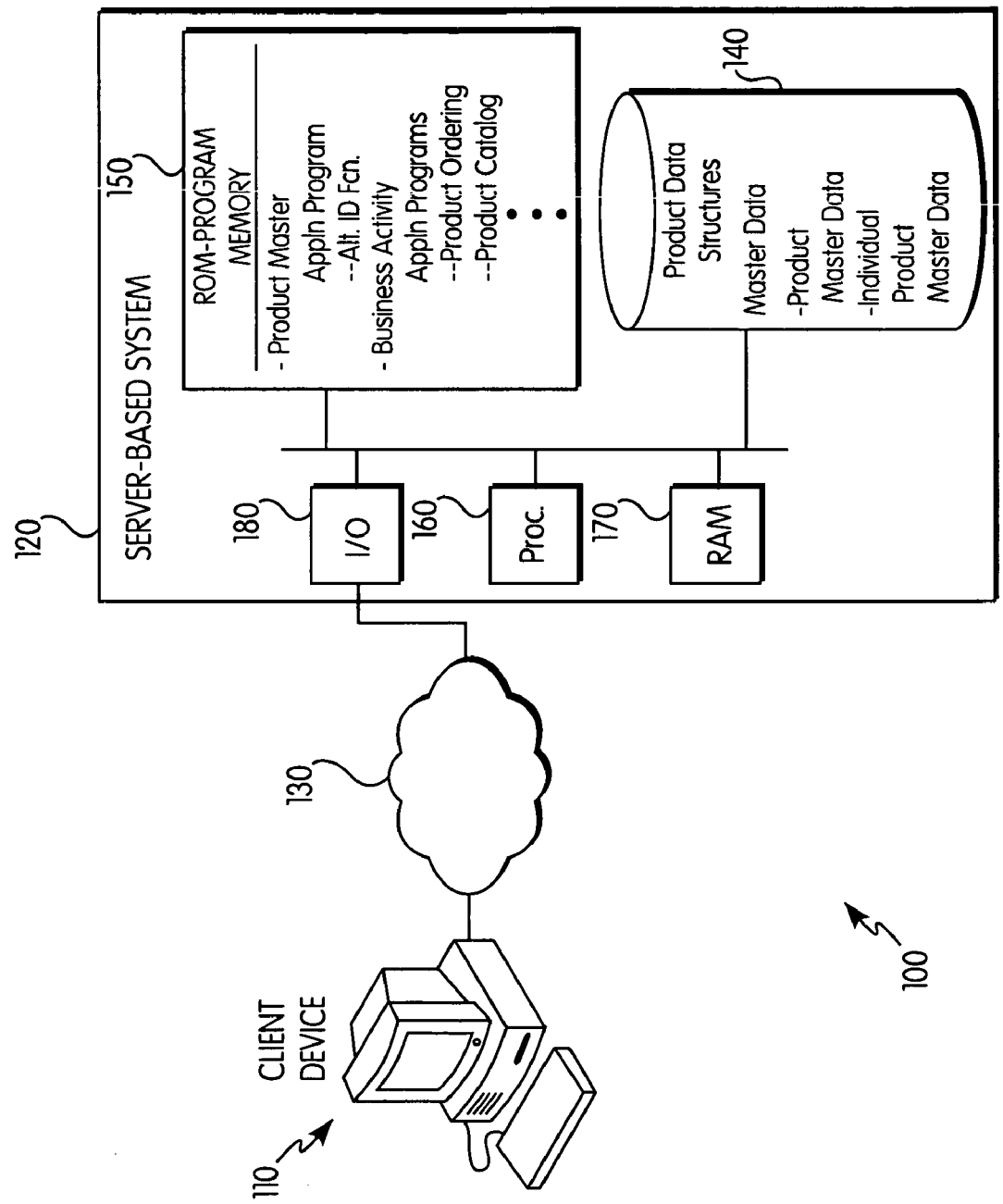
FIG. 1 is a block diagram of a networked computing system.

A networked computing system 100, shown in FIG. 1, includes a client computer system 110 networked with a server-based system 120 by way of network 130. The server-based system includes a master data database 140 of product data. The product master data includes one or more identifier attributes that identify various products for which data is stored in the database. Examples of product master data are product master data and individual product master data. Individual product master data is master data for products that are unique individual assets, such as a particular automobile. Product master data, on the other hand, is master data for a particular type of product, such as a particular make and model of automobile where there may be many unique automobiles that are of the particular make and model.

The server-based system 120 also has software programs that are stored in memory 150, which in this is example is read-only memory (ROM). The software programs include a product master software application and various business activity software programs. The product master program is executed to maintain the product data stored in the database 140. An additional, or alternative, identifier function (shown as the "Alt. ID Fcn." in FIG. 1) may be included in the product master software application program functionality. The term "alternative identifier" may be an attribute that is used as another common description for products, for example, an International Standard Book Number (ISBN) number for books and a vehicle identification number (VIN) for automobiles. An "alternative identifier type" would be an identifier type that is created in addition to one or more standard identifier types that may have been previously defined as part of the product category data structure, and that may be hard coded as part of the product category data structure and thus not easily changeable. The term "identifier type," or "ID type," may refer to the grouping together of functions of various alternative identifiers that are nearly the same. For example, all ISBN's may be grouped together under one ID type, because important characteristics for the ID type such as format conversions and consistency checks may always be the same.

Generally, in many cases there are other common descriptions for products other than a standard identifier type that may have been previously defined for a particular product category. For example, a previously defined standard identifier type may be a Global Trade Identifier Number (GTIN), which may not be an identifier type that has meaning to a person using a software application. Thus, instead of using a GTIN in the software application, an ISBN number may be used for books and a VIN may be used for automobiles. In the case of a software application business process where one or more previously defined standard product identifiers are being used, it is possible that an alternative identifier may be used instead. It is the alternative ID functionality in the FIG. 1 system that enables this to occur.

The alternative identifier function enables alternative identifier types to be defined for product categories, and may form a general framework for various ID types. An object-oriented software design may be used for the framework, in which case it is possible that the functions that are the same for all areas are only implemented once, and that it is easy to specialize and extend various defined ID types, for example by providing interfaces. Thus, for example, a format conversion may be carried out for all ID types, but the relevant method that carries out the conversion may be implemented by each ID type.

It may be possible to use alternative product ID's in software application business processes instead of the previously defined standard product ID. As such, it may be possible to perform a search for a particular ID using an alternative ID type. In addition, an alternative ID may appear as header information for a product during execution of a software program business process that displays a product record. This may be done, for example, by defining, using the alternative identifier software function, any identifier type for a product category—either standard ID type or an alternative ID type—to be a main ID type.

The various business activity, or process, software programs shown stored in memory 150 utilize the product data stored in the database 140 during their execution. For example, in a product-ordering software application program, a search of the product master data may be executed to retrieve information about a product to be purchased, such as is common in internet-based shopping software applications. In such a case, product identifier attributes are helpful in performing the search. In addition, similar product search functionality may be present in a product catalog software application program. Many other examples of software application programs that make use of the product master data are also possible in addition to the illustrative examples shown in FIG. 1.

The server-based system 120 in this example includes, as is conventional, a processor 160 that executes software program instructions, random access memory (RAM) 170 in which program instructions may be loaded for execution by the processor, and input/output (I/O) interface circuitry for interconnecting to the client device 110 through the network 130. As will be understood by one of skill in the art, the different software application programs may be executed on different server devices, or on the same device.

Figure 2:
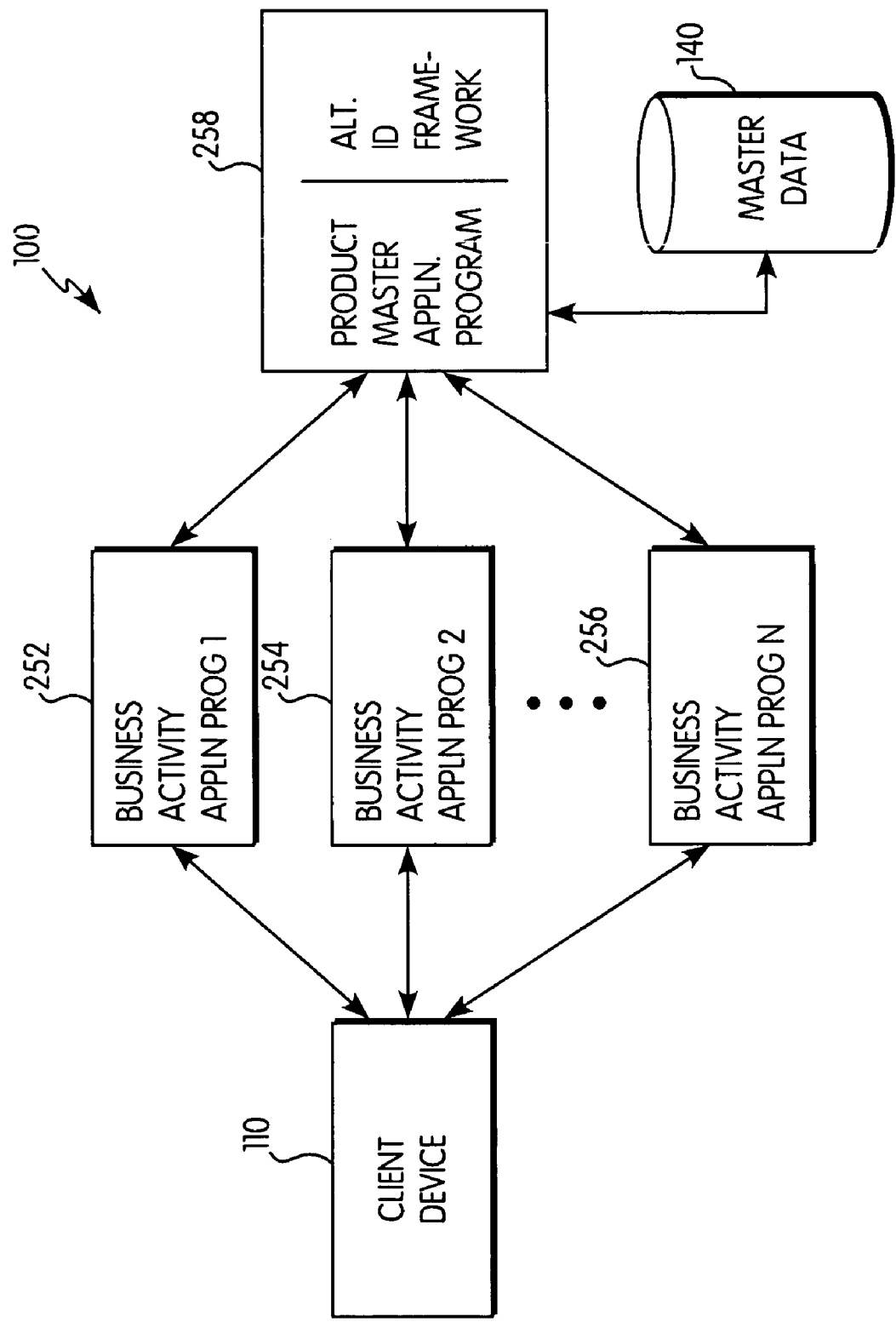
FIG. 2. is a functional diagram of the system shown in FIG. 1, showing data flows between components.

In FIG. 2, the networked computing system 100 shown in FIG. 1 is shown diagrammatically to show data flows between different components. The client 110 may be used to interact with various different server-based business activity application programs 1, 2 through N (252, 254 through 256). Also, each of the application programs interacts with an executing product master application program 258 to utilize the product master data stored in the database 140. The product master application program 258, in this example, includes an alternative ID framework. In other implementations, the alternative ID framework may be separate from the product master application program. Thus it can be seen that multiple application programs utilize the same product master database 140, perhaps for different reasons and purposes.

FIGS. 3 and 4 show an example data structure (FIG. 3) and example product data (FIG. 4) for product master data and individual product master data that may be stored in the database 140 shown in FIGS. 1 and 2. Referring first to FIG. 3, the example product master data structure is shown for a product identified as "Product-1," and this product has associated with it various attributes which may have a status of being either an identifier type of attribute, or a non-identifier type of attribute. The first attribute shown for "Product-1" is a standard unique identifier (ID) value. As indicated, this attribute is an ID type of attribute. The next attribute is a "Product Category" attribute that indicates the category of products, or family, to which the product belongs. The "Product Category" is not an ID type of attribute. Other attributes for the product are also shown, and include "Attribute-1" through "Attribute-N." Of these, only "Attribute-2" has been defined to be an ID type of attribute. While the standard unique ID type may be defined to be an ID type for a product category within a product category data structure, other attributes—such as "Attribute-1" shown in FIG. 3—may be defined to be an ID type in a separate alternative ID type framework.

Referring now to FIG. 4, example product data are shown. The example is a specific book, Tolstoy's War and Peace. A standard unique ID value may be a global unique identifier (GUID) value that has been given to this book to distinguish it from other books. The GUID is an ID type of attribute that may be defined in a product category data structure to be the standard ID type for the product category. The product category is books, which is not an ID type of attribute. The next attribute is an International Standard Book Number (ISBN), which has been established to be an ID type of attribute, and may be an alternative ID type. Publisher and retail price attributes are not ID type attributes.

Referring back to FIG. 3, the example individual product master data structure is shown for a product identified as "Individual-Product-1," and this individual product has associated with it various attributes which, like the product master data structure, may have a status of being either an identifier type of attribute, or a non-identifier type of attribute. The first attribute shown for "Product-1" is a standard individual product unique identifier (ID) value. As indicated, this attribute is an ID type of attribute that may be defined in a product category data structure to be the standard ID type for the product category. The next attribute is a "Product ID" attribute that indicates the category of products, or family, to which the individual product belongs. The "Product ID" is not an ID type of attribute, however, because every individual product instance created will have the same product ID. Other attributes for the product are also shown, and include "Attribute-1" through "Attribute-N." Of these, "Attribute-1" and "Attribute-3" have both been defined to be ID type attributes, and may be alternative ID-type attributes.

The product and data structure shown in FIG. 3 may be defined by product category. For example, a product category may be defined that has various attributes associated with the product category, such that when an instance of that product category is created, the defined product category attributes will be valid for the created product instance. Also, when the product data structure is being defined, there may be defined a single unique identifier attribute for the product category, which is shown in FIG. 3 as the standard unique ID. The same concepts may apply to individual products, and in that case, the product instance that may be created may describe a single unique asset, as opposed to an asset class.

Figure 5:
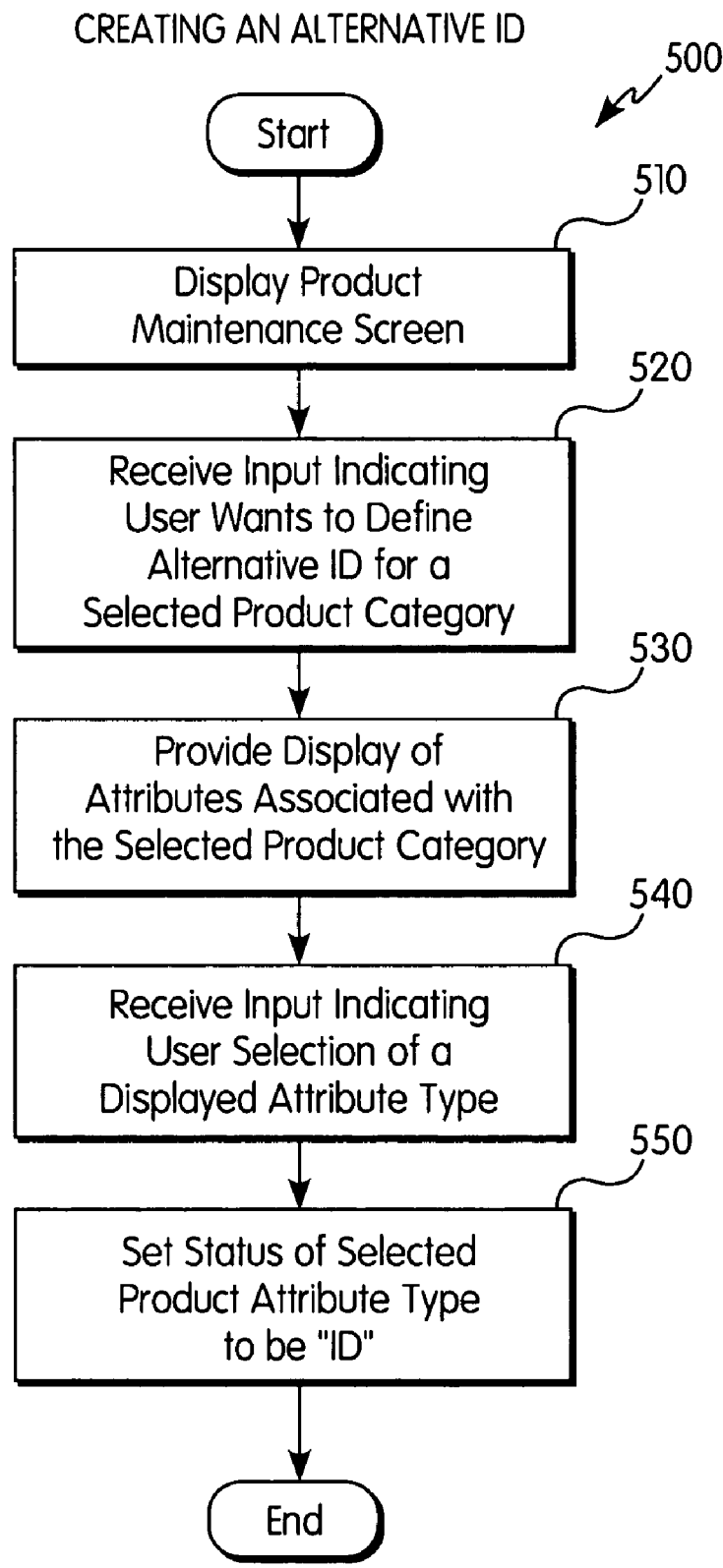
FIG. 5 is a flow chart of a method for establishing an alternative identifier type for a product category.

A flowchart, shown in FIG. 5, illustrates a method 500 for establishing an additional, or alternative, identifier type within a data structure for a category of products. The method may be carried out by a system executing a software program, such as the product master application program (and specifically the alternative ID function extension to that program) or one of the business activity application programs shown in FIG. 1. In the latter example, a customizing module of the business activity application program may include the functionality to establish an alternative identifier type.

The method 500 shown in FIG. 5 begins, at step 510, with the providing of a display of a product maintenance screen on a display device. This display may be provided on the client device 110 shown in FIG. 1, for example. The user interacts with the client device 110 to provide an input to the client device 110 that the user would like to define an alternative ID type for a selected product category. That input is received, for example by the server-based system 120, at step 520. In response, attributes defined in the data structure for the selected product category are retrieved, and, at step 530, a display of a list of the attributes is provided at the client device 110. A user then selects or inputs a product attribute that the user would like to serve as an alternative identifier type for the product. At step 540, that input is received. In response, at step 550, the ID type is generated, which may include setting, within an alternative ID framework, an ID status for the selected product attribute to be an ID type of attribute. In addition, a class that implements all necessary methods may be generated automatically when the ID type is generated.

Figure 6A:
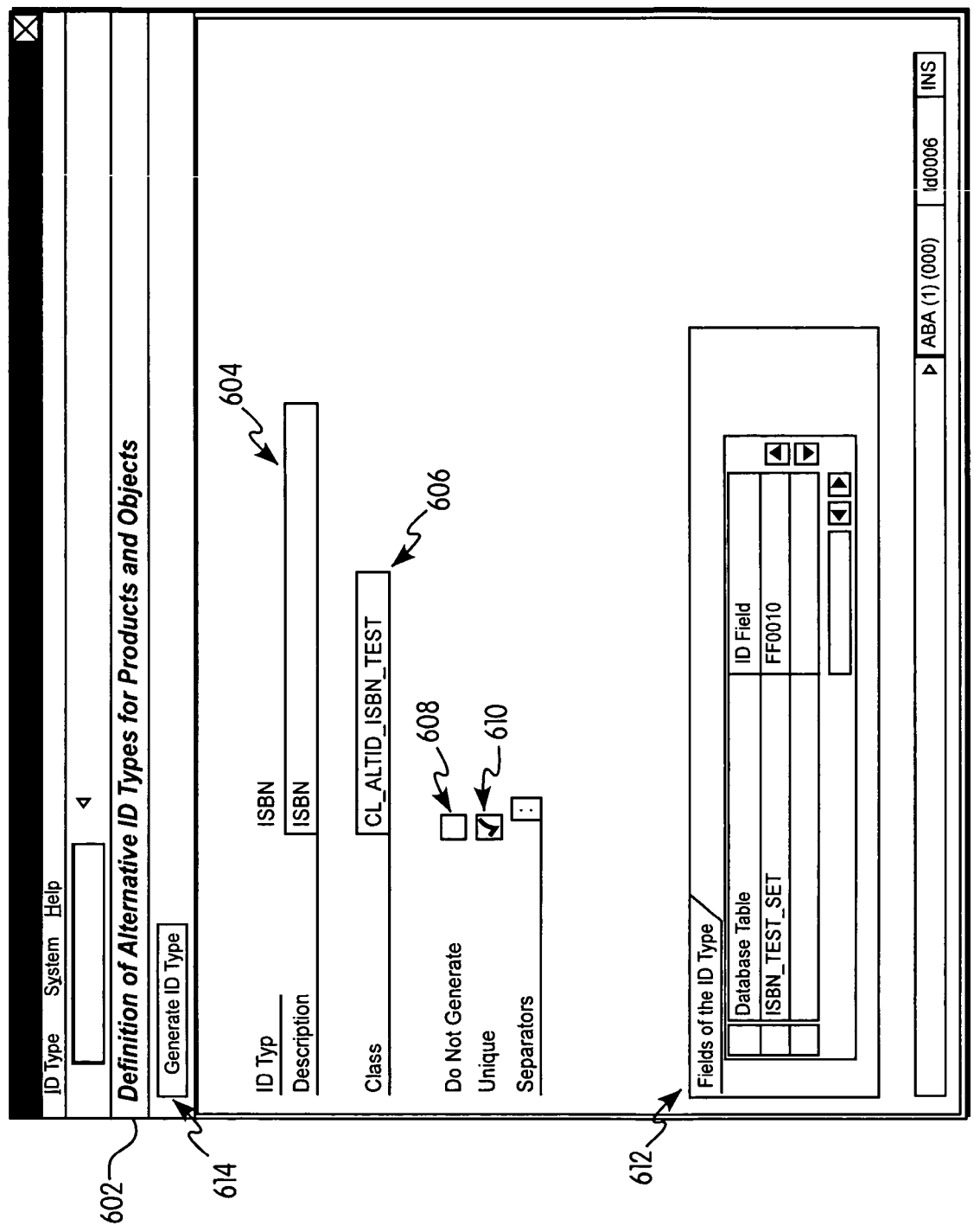
FIGS. 6A and 6B are screen snapshots showing example displays that may be utilized in carrying out the method shown in FIG. 5.

FIG. 6A shows an example screen snapshot 600 that may be displayed at client device 110 during the method described in FIG. 5. As indicated in a header field 602 of the screen snapshot 600, the display enables user "Definition of Alternative ID Types for Products and Objects." The alternative ID type is being defined for a selected product category, in this case, a category entitled "Products and Objects." The screen snapshot 600 shows the definition of an alternative ID type that has been input by a user. The screen snapshot includes various input/output fields and function keys. First, a user may enter an identifier description in a "Description" input field 604. In this case, the identifier "ISBN" has been entered in the "Description" input field, which means that the user wants to define the ISBN to be an alternative ID type for the product category. When that information is entered, the system searches for an applicable class for the entered alternative ID, and displays a class identifier for a predefined class in a "Class" input field 606. This predefined class being associated with the ID type is what implements all of the necessary methods associated with the alternative ID type.

A "Unique" input check-type input field 608 may be selected to indicate that the defined ID is of a type that will be unique for each instance of the product that is generated. In other words, each ID of the ID type can have no more than one product record, or instance, associated with it. As such, no two product records can be defined that have the same unique ID. A "Separators" input field 610 may be used to define a character that will be used to separate two attributes that make up a multiple-attribute identifier. It is possible that multiple attributes may be included in a single ID type, in which case the defined "Separator" will be used at run time to provide separation of the two attributes on a graphical user interface. In the FIG. 6A example, the "Separator" has been defined to be a colon symbol.

A "Fields of the ID Type" tile 612 is shown near the bottom of the screenshot 600. This "Fields" tile 612 displays a list of product attributes that have been selected by a user to be included as a field of the ID Type being defined. The attribute listing includes two columns. The first column is a "Database Table" column that identifies the set type to which the selected ID type attribute belongs. The second column is an "ID Field" within that set type that is the selected attribute.

A help menu (not shown in FIG. 6A) may be used in connection with the "Fields" tile to provide a list of predefined set types and attributes for the product category from which the user can select. Such a help menu may be displayed when a user selects a predefined input function, such as an "F4" key on a keyboard, when a cursor is positioned on or near the "Database Column," and then on or near the "ID Field" column. When doing so, a list of all valid set types or attributes that may be entered may be displayed.

When the user is finished defining the ID type on the screen, the user may select a "Generate ID Type" function button 612 to automatically generate the new ID type for the selected product category. Accordingly, with very few inputs—namely, the name of the ID type, a short text, the name of a set type, and the name of one or more attributes—the new ID type may be automatically generated for the product category. This new alternative ID type definition may be stored in memory in association with an alternative ID type framework.

Figure 6B:
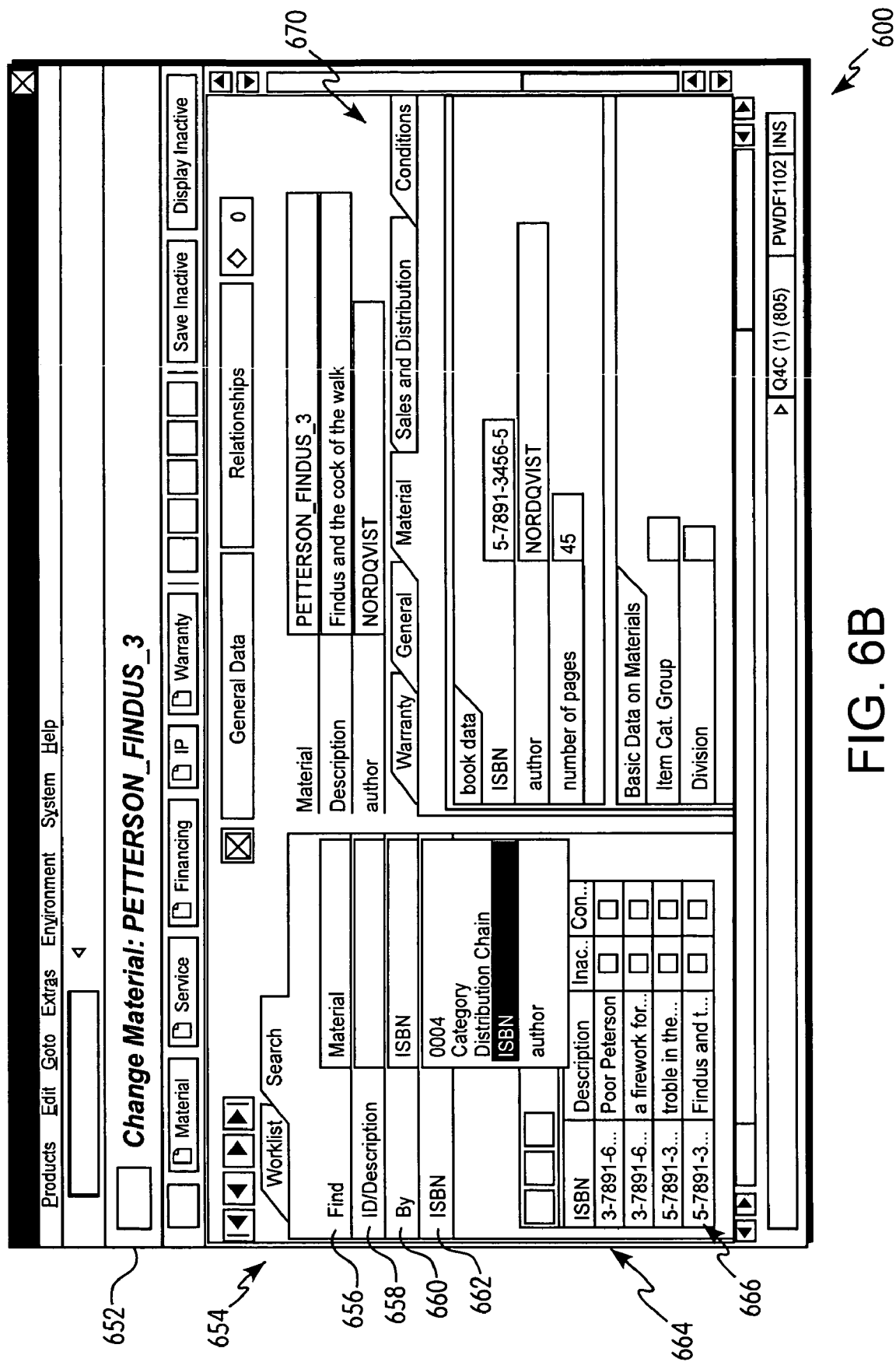

FIG. 6B is a screen snapshot 650 that shows how the alternative ID type that was newly defined in FIG. 6A may be used in a software application that uses an electronic product data database. The screen snapshot 650 may appear in a software application for a product definition software application, for example, where a user may create and change a product definition. As indicated in the screen snapshot header 652, the screen is for a "Change Material" function. A search function tile 654 is shown on the left-hand side of the screen snapshot 650, and includes several input fields. As with the previous screenshot, a help menu may be used in connection with each of the input fields (as is shown for a "By" input field) to provide a list of valid attributes that may be selected and entered in the input field. Again, such a help menu may be displayed when a user selects a predefined input function, such as an "F4" key on a keyboard, when a cursor is positioned on or near the data input field.

The input fields included in the search function tile include, firstly, a "Find" field 656 in which a product category is entered. Again, a help menu (not shown) may be utilized to provide a user with a list of valid product categories from which to select. In this example, a product category called "Material" has been selected for the search. Next, an "ID/Description" input field 658 is provided, which is where a predefined standard ID type (in other words, not an alternative ID type) for the category may be entered if known by the user. For example, the predefined standard ID type may be a GTIN, which a user may not be able to easily recall. As such, the "ID/Description" input field 658 is shown as having no user entry in this example.

Next, a "By" input field 660 is where a user may enter a previously defined alternative ID type to use in the search. A help menu is shown displayed on the "By" input field 660, and lists all of the alternative ID types that have been defined (for example, within an alternative ID framework) for the product category "Material." In this example, five alternative ID types have been defined for the product type—namely "0004," "Category," "Distribution Chain," "ISBN," and "author." In this case, the ISBN alternative ID type is shown as having been selected by a user. Next, a search term input field 662 with the selected ISBN alternative ID type is provided. Although not shown in the figure, the numbers "7891" were entered in the ISBN field, and a search has been executed of the product database.

A list view 664 is provided below the input fields and displays a list of the search results, or in other words, a list of records within the product data database where the numbers "7891" are included in the ISBN. At least four such records that meet the search criteria are shown in the list view 664.

A detailed view product record display 670 is provided on the right-hand side of the screen snapshot 650. This is where the details of a selected record from the list view 666 may be displayed. The product record display includes three header data fields, showing the "Material" identifier for the product ("PETTERSON_FINDUS_3"), a brief "Description" of the product ("Findus and the cock of the walk"), and the name of the author ("NORDQVIST").

Various tabbed display topics are provided under the header information, and in this example, a "Material" tab has been selected. As such, a display of the material make-up of the product is provided. As shown, the ISBN, author, and number of pages for the book are shown in this tab display. The user may change the material make-up by revising or adding to the existing information. As such, a new material definition may be made for the product.

Figure 7:
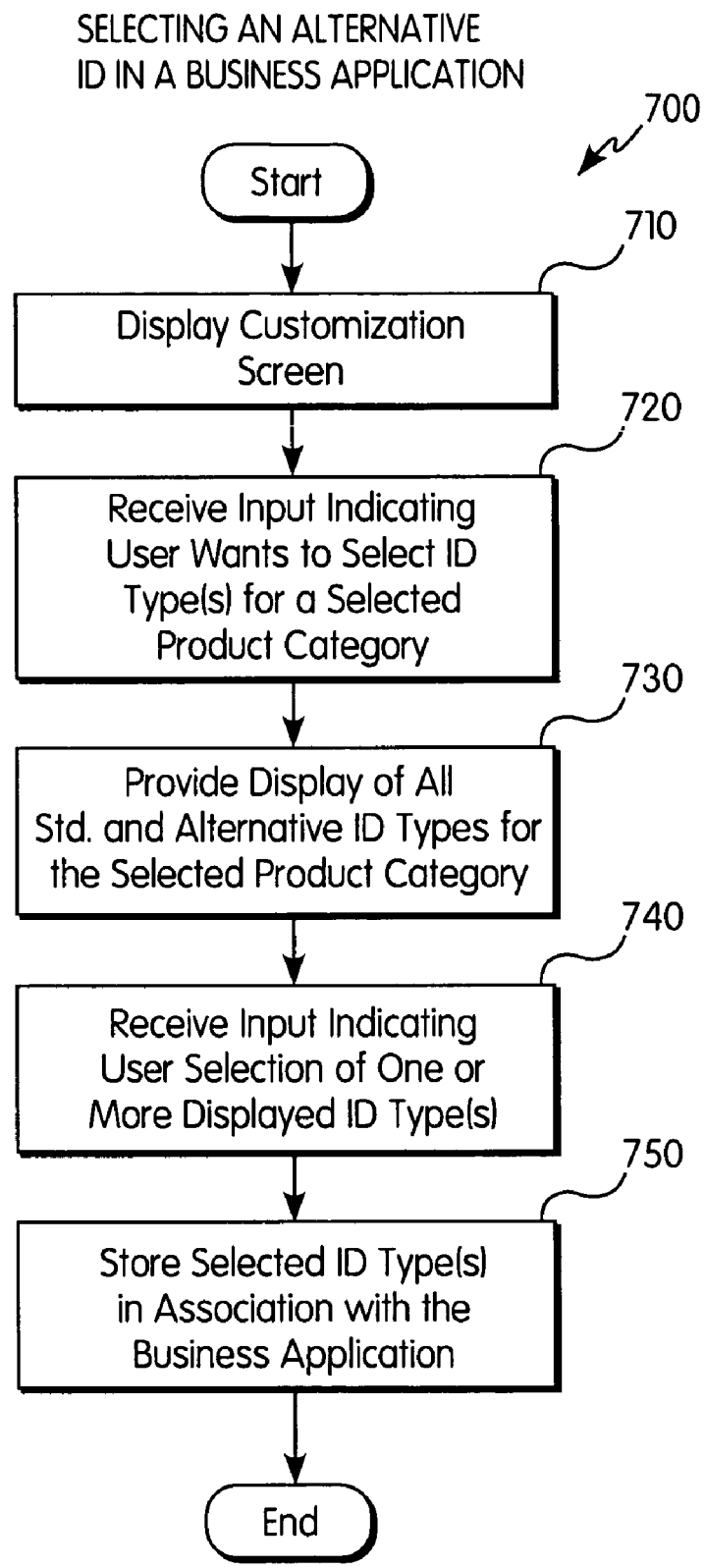
FIG. 7 is a flow chart of a method of selecting an attribute to serve as an identifier type of attribute during execution of a software application program.

A flowchart, shown in FIG. 7, illustrates a method 700 of selecting an attribute to be used in a product-identifying function of a selected application software program procedure. The attribute may be selected from among both 1) one or more attributes predefined to be an identifier type of attribute (that is, standard ID types) within a data structure for a category of products for which data relating to the products are stored in an electronic database, such as the product master database 140 shown in FIGS. 1, and 2) one or more attributes for the product category that have been defined to be alternative ID types, for example, within an alternative ID framework. The method may be carried out by a system executing a software program, such as one of the business activity application programs shown in FIG. 1. A customizing module of the business activity application program may include the functionality to select the attribute.

The method 700 shown in FIG. 7 begins, at step 710, with the providing of a display of a customizing screen for a specific application program scenario, or procedure, such as a search function scenario, that uses a product data database. This customizing screen display may be provided on the client device 110 shown in FIG. 1, for example. A user interacts with the client device 110 to provide an input to the client device 110 that the user would like to select an ID type for a selected product category. That user input is received, for example by the server-based system 120, at step 720. In response, attributes defined in the data structure for the selected product category are retrieved, where the attributes have been previously established to be an identifier type of attribute either in the product category data structure or in an alternative ID framework.

Next, at step 730, a display of a list of all of the ID type of attributes for the selected product category is provided at the client device 110. A user then selects or inputs one or more of the displayed attributes that the user would like to be used in the application program scenario. This may be done by defining a customizing profile for the application program scenario, where the profile includes an identification of all of the ID types (standard and alternative) that are applicable for the application program scenario. At step 740, that input is received. In response, at step 750, the selected ID-type attributes are stored in association with the business activity software application, such that during run time of the business activity software application, the selected identifiers are used.

In addition, a main identifier type may similarly be defined for a particular software application program or procedure. This may be done to specify the ID type that is used in header information displayed for product records in the software application or procedure. It will be understood that the ability to define main ID types allows the possibility that different software application programs may use different ID types for header information displays. As such, for example, a VIN may be used as a product record header in an automobile manufacturer application, while a name and address is used as a product record header in an automobile service application.

Figure 8:
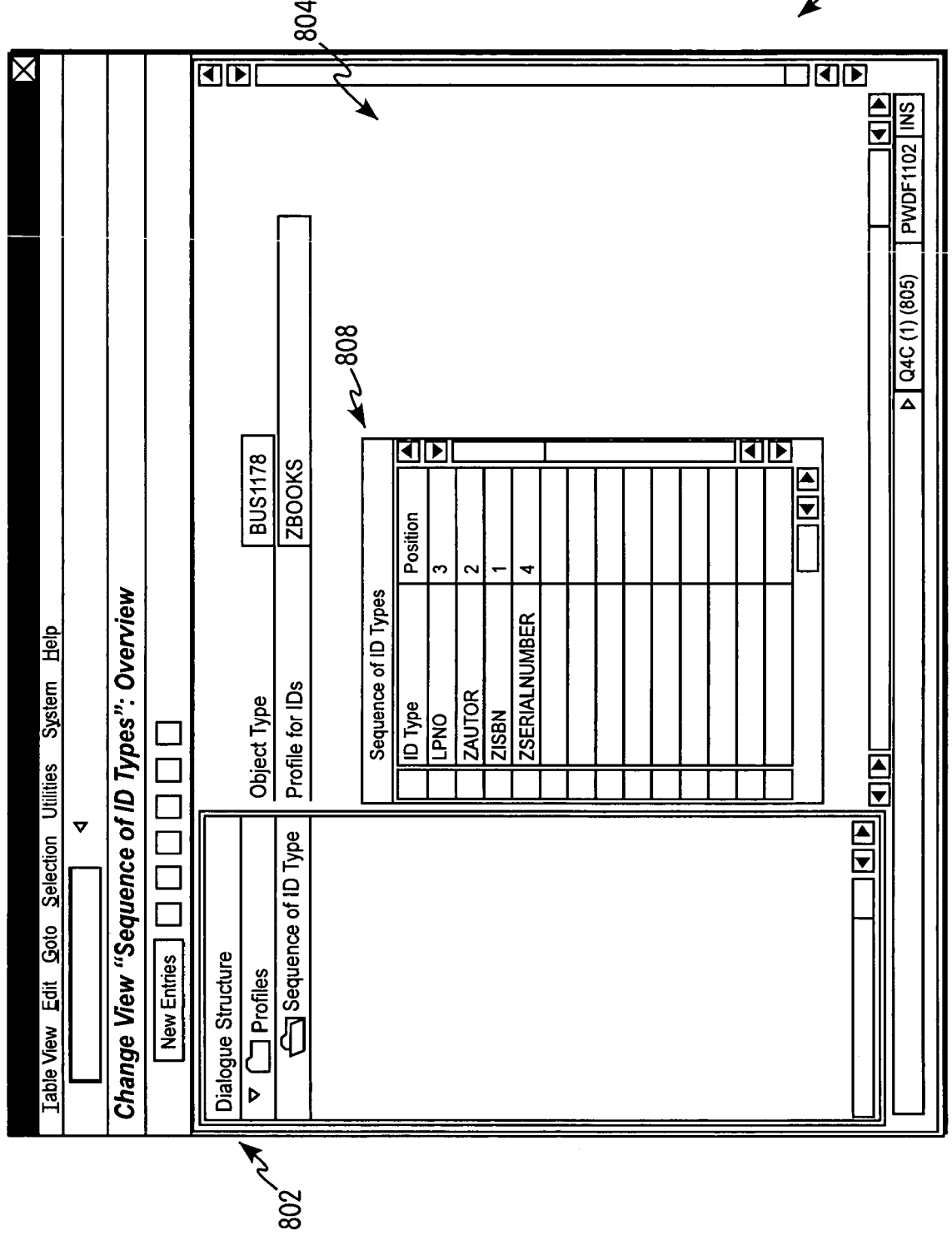
FIG. 8 is a screen snapshot showing an example display that may be utilized in carrying out the method shown in FIG. 7.

FIG. 8 shows an example screen snapshot 800 that may be displayed at client device 110 during the customizing method described in FIG. 7. A user may use such a screen to define a profile that can be assigned to a business context in a software application. A menu listing 802 on the left-hand side of the screen snapshot 800 shows a list of ID type profiles that have been defined. In this case, only one profile is shown, and it is entitled "Sequence of ID Type." A detailed view 804 of a selected profile (here, the "Sequence of ID Type" profile) is provided on the right-hand side of the screen snapshot 800. At the top of the detailed view 804 are two header fields 806 including: 1) an "Object Type" field (with "BUS1178" as a value for this field), which is the category of products, or objects, to which the products belong; and a "Profile for ID's" field, which is an identifier for the profile.

A profile definition area 808 is provided below the header fields 806. The profile definition area 808 is where a user enters the alternative ID types that will be included in the sequence, and the position in the sequence in which the alternative ID type is to occur. For example, when this profile is assigned to, and used with, a search function, the profile would define the sequence that will be executed for a search. For example, first there will be a search for products using an ISBN ID type (in that "ZISBN" is defined under the "ID Type" column, and has a position defined to be "1"), and second a search using an Author ID Type, etc.

Figure 9:
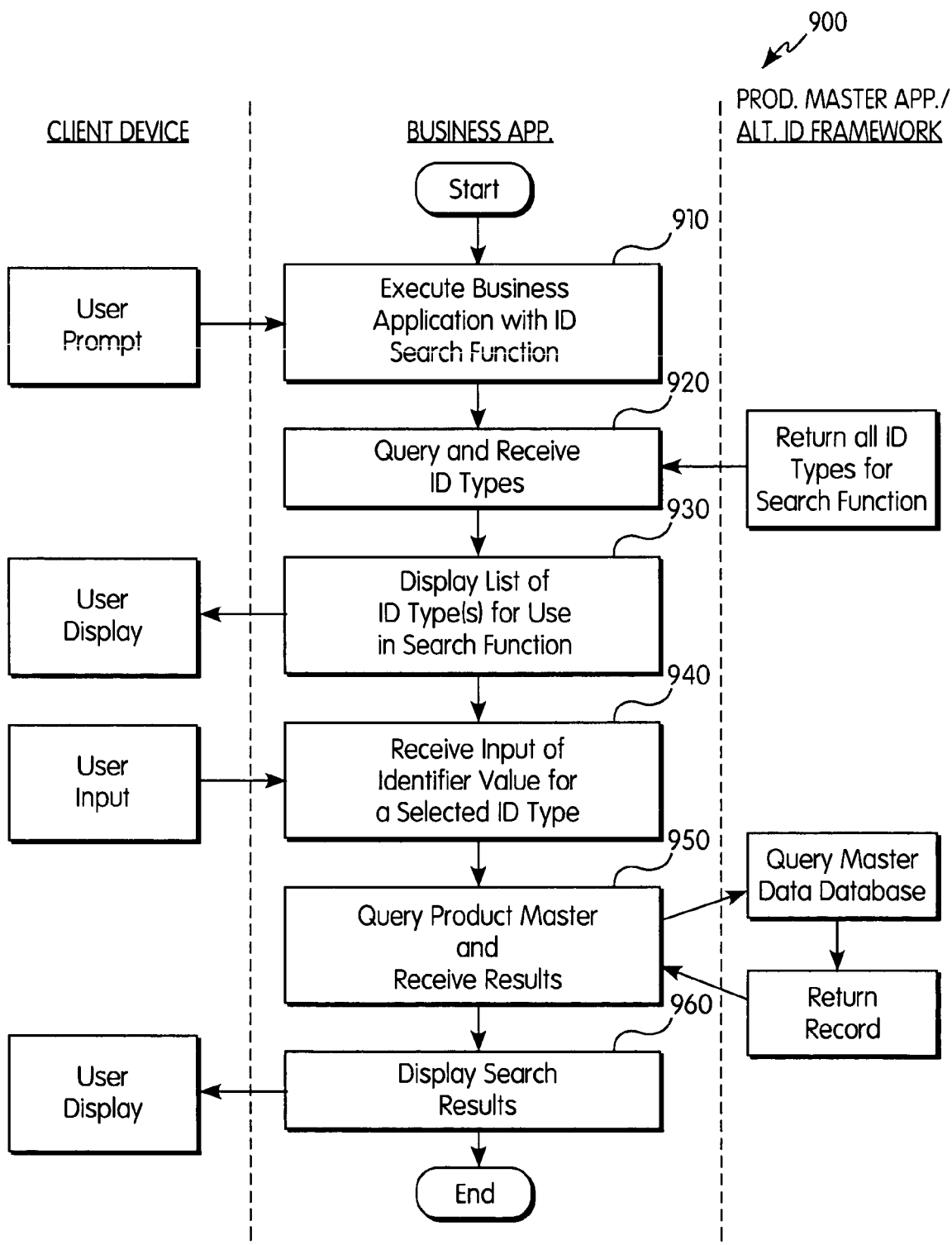
FIG. 9 is a flow chart of a method of executing a software application at run time, after customizing has been performed to define the identifier types to be used during execution of the business activity software.

A flowchart, shown in FIG. 9, illustrates a method 900 of executing a business activity software application at run time, after customizing has been performed to define the identifier types to be used during execution of the business activity software. In the FIG. 1 example, the software function that is being executed is a product search function. Other types of functions that utilize identifier attributes may also use a similarly designed method. The method of FIG. 9 may be carried out by a system executing a software program, such as one of the business activity application programs shown in FIG. 1.

The method 900 begins, at step 910, with the receipt of user prompt, whereupon a business application software program-controlled function begins execution. As mentioned previously, in this example the software-controlled function is a search function, for example, a search for particular product master data stored within the product master database 140 (FIG. 1). Next, at step 920, the product master software application is queried for all ID types associated with the search function, and the product master program application returns the requested ID type information. This may occur, for example, when a help function is executed that requests a list of valid ID types that may be used for a search (as shown in the FIG. 6 screen snapshot 600). In performing step 920, a profile of ID attributes previously defined for the search (for example, using the FIG. 7 method) may be retrieved and used. Then, at step 930, a display (for example, the help screen) is provided, for example on a client device 110, of the retrieved product attributes that may be used as search fields. The user may then select one or more of the displayed ID types from the help listing that will serve as the ID type, or types, used in the search function (for example, in FIG. 6 where the ISBN ID type was selected).

Referring still to FIG. 9, the user may then enter search terms (that is, identifier values) at the client device 110 for the ID-type product attributes, and execute a search to be performed. This search request is received, at step 940, at the server-based system 120. Upon receiving the search request, a query may be forwarded to the product master software application, whereupon, at step 950, the product master database may be queried and search results that satisfy the search request returned. Next, at step 960, a display is provided, for example at client device 110, of all the product database records within the product master database 140 that satisfy the search request.

Figure 10:
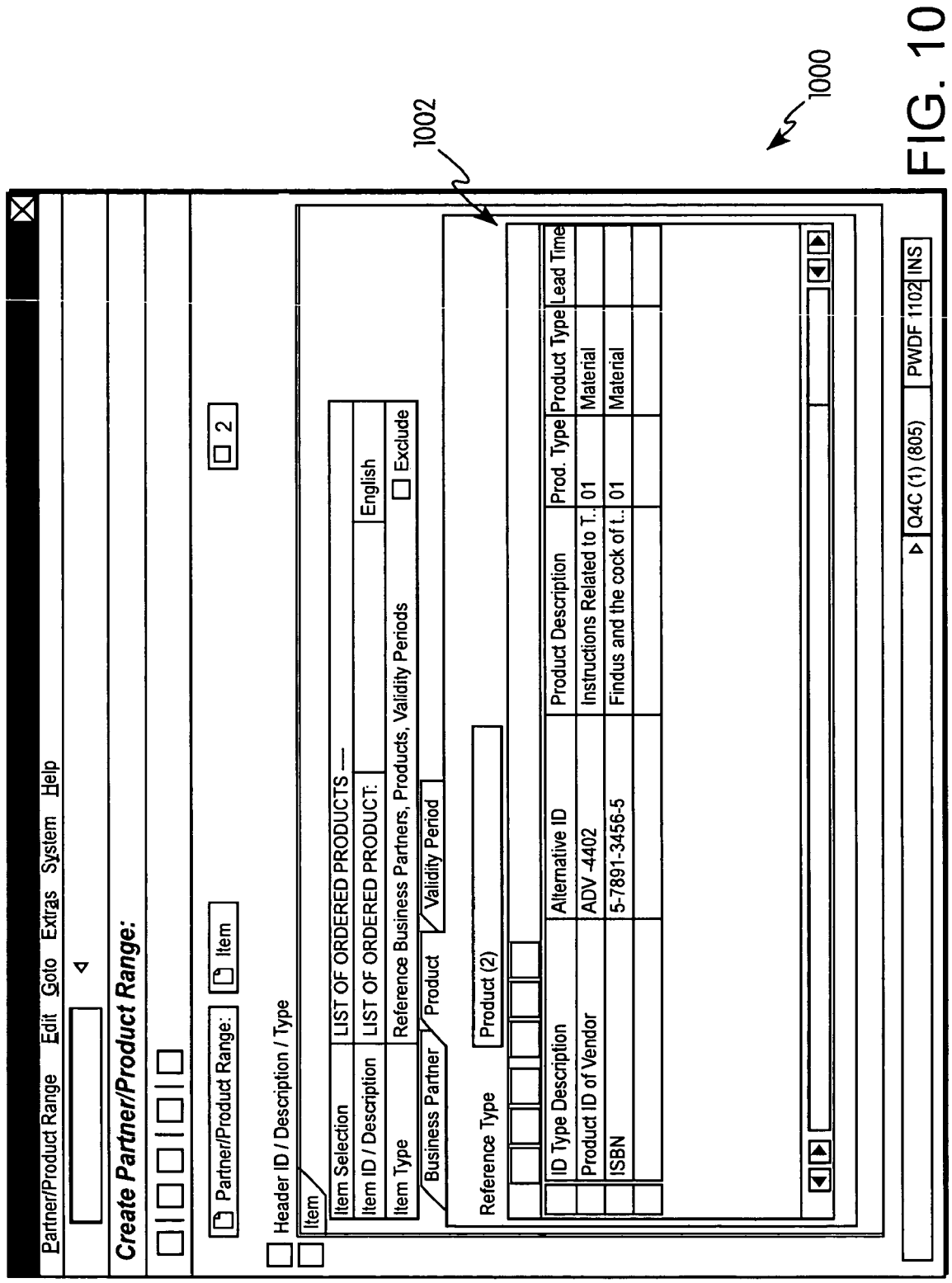
FIG. 10 is a screen snapshot showing an example display for a software application.

FIG. 10 shows an example screen snapshot 1000 for another software application that uses alternative ID type definitions. This is a screen snapshot 1000 of a "Partner/Product Range" application that includes a list of products that apply to a particular business partner, for example, a list of products that the business partner has ordered. A tabbed "Product" view provides a list view of all of the products associated with a selected business partner (two in all), and the products are shown as using different ID types. For example, the first listed product is "Instructions" having an "Alternative ID" of "ADV-4402," which is a "Product ID of Vendor" ID Type. The second listed product is the book entitled "Findus and the cock of the walk," having an "Alternative ID" of "5-7891-3456-5," which is an "ISBN" ID Type. The values of the selected products are therefore listed instead of the respective predefined standard product ID types for the particular product category.

A number of embodiments of the invention have been described. Nevertheless, it will be understood that various modifications may-be made without departing from the spirit and scope of the invention. Accordingly, other embodiments are within the scope of the following claims.

What is claimed is:

1. A method of customizing and executing an application software program that during execution communicates with an electronic database of product data, the method comprising:

receiving an input for customizing an application software program indicating a user selection of one of a plurality of predefined database attributes that are each defined to be an identifier type of attribute that identifies to a user an identity of a defined product, wherein the product has a plurality of attributes to identify the product, and wherein the selected attribute is associated with a category of products for which data relating to products that are members of the product category are stored in the electronic database;

customizing the application software, stored upon a computer readable storage medium, including activating the selected attribute for use during execution of a selected procedure of the application software program, wherein the attribute was previously inactive during the selected procedure of the application software program, and wherein the procedure is defined generically to use an attribute defined as an identifier type of attribute, and wherein the selected procedure includes a product-identifying function; and executing the selected procedure of the application software program, and in so doing, using the selected attribute where the procedure is generically defined to use an attribute defined as an identifier type of attribute, wherein executing the selected procedure of the application software program includes generating a display using information about the selected attribute.

2. The method of claim 1 wherein the data structure has more than one attributes predefined to be an identifier type of attribute.

3. The method of claim 2 wherein the method is performed multiple times to select multiple attributes to be used during execution of the selected procedure.

4. The method of claim 1 wherein the selected attribute is further defined as a main identifier type that is used in a product record header display procedure.

5. The method of claim 1 wherein the application software program procedure is a product search procedure, and the selected attribute is usable as a search field to perform a product search.

6. The method of claim 1 wherein the application software program procedure involves the display of product identifying information for a product record stored in the electronic database.

7. The method of claim 1 further comprising providing a visual display of a list of attributes from which the selection of a predefined database attribute is made.

8. The method of claim 2 wherein multiple different software application programs provide for communication with the same electronic database of product data.

9. The method of claim 8 wherein different identifier type attributes are defined to be used for different application software program procedures.

10. The method of claim 3 wherein multiple different business processes within the same software application program each provide for communication with the same electronic database of product data.

11. The method of claim 10 wherein different identifier type attributes are defined to be used for different procedures.

12. A computer program product tangibly embodied in a computer readable storage medium and comprising program instructions that when executed perform a method of customizing and executing an application software program that during execution communicates with an electronic database of product data, wherein the method comprises:
  receiving an input for customizing an application software program indicating a user selection of one of a plurality of predefined database attributes that are each defined to be an identifier type of attribute that identifies to a user an identity of a defined product, wherein the product has a plurality of attributes to identify the product, and wherein the selected attribute is associated with a category of products for which data relating to products that are members of the product category are stored in the electronic database;
  customizing the application software, stored upon a computer readable storage medium, including activating the selected attribute for use during execution of a selected procedure of the application software program, wherein the attribute was previously inactive during the selected procedure of the application software program, and wherein the procedure is defined generically to use an attribute defined as an identifier type of attribute, and wherein the selected procedure includes a product-identifying function; and
  executing the selected procedure of the application software program, and in so doing, using the selected attribute where the procedure is generically defined to use an attribute defined as an identifier type of attribute, wherein executing the selected procedure of the application software program includes generating a display using information about the selected attribute.

13. The computer program product of claim 12 wherein the data structure has more than one attributes predefined to be an identifier type of attribute.

14. The computer program product of claim 13 wherein the method is performed multiple times to select multiple attributes to be used during execution of the selected procedure.

15. The computer program product of claim 12 wherein the application software program procedure is a product search procedure, and the selected attribute is usable as a search field to perform a product search.

16. The computer program product of claim 12 wherein the application software program procedure involves the display of product identifying information for a product record stored in the electronic database.

17. The computer program product of claim 13 wherein multiple different software application programs provide for communication with the same electronic database of product data.

18. The computer program product of claim 17 wherein different identifier type attributes are defined to be used for different application software program procedures.

19. The computer program product of claim 14 wherein multiple different business processes within the same software application program each provide for communication with the same electronic database of product data.

20. The computer program product of claim 19 wherein different identifier type attributes are defined to be used for different procedures.

* * * * *